Nov. 3, 1925.   H. M. CARROLL, SR   1,559,550
ATTACHMENT FOR EYEGLASSES
Filed Jan. 26, 1924
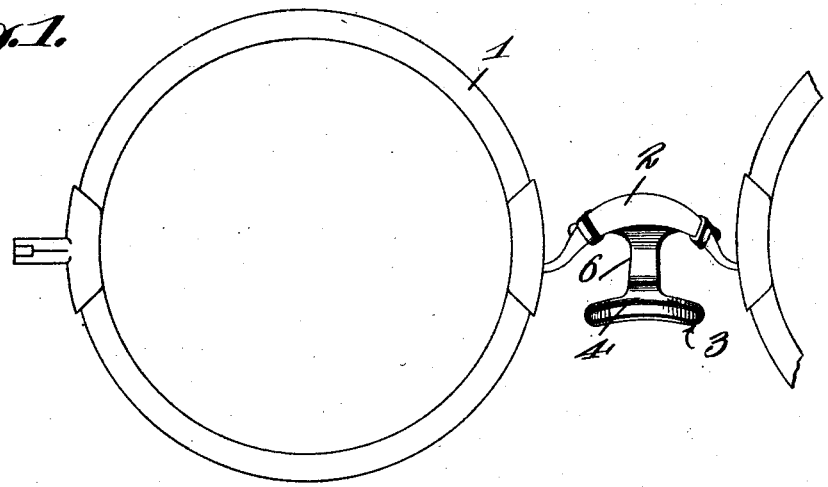
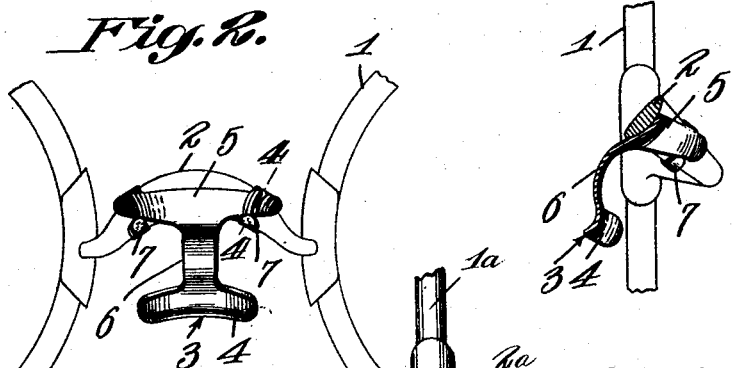
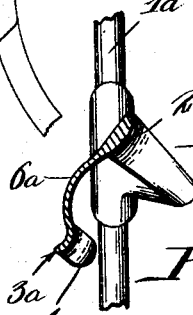
H. M. Carroll, Sr.
Inventor
By C. A. Snow & Co.
Attorneys Patented Nov. 3, 1925.

1,559,550

UNITED STATES PATENT OFFICE.

HOUSTON M. CARROLL, SR., OF SAN ANTONIO, TEXAS.

ATTACHMENT FOR EYEGLASSES.

Application filed January 26, 1924. Serial No. 688,743.

*To all whom it may concern:*

Be it known that I, HOUSTON M. CARROLL, Sr., a citizen of the United States, residing at San Antonio, in the county of Bexar and State of Texas, have invented a new and useful Attachment for Eyeglasses, of which the following is a specification.

By way of explanation it may be stated that when the wearer of a pair of glasses inclines his head, the glasses frequently tilt on the nose of the wearer and often drop off, and the foregoing being understood, the present invention aims to provide a novel form of nose-engaging prop, adapted to hold the glasses in place and to avoid the undesirable consequences above mentioned.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown, can be made, without departing from the spirit of the invention.

In the drawings:

Figure 1 shows in elevation a pair of glasses whereunto the device forming the subject matter of this application has been applied; Figure 2 is a fragmental rear elevation of the structure shown in Figure 1; Figure 3 is a cross section taken through the bridge; and Figure 4 is a section taken on the line 4—4 of Figure 2.

Figure 5 is a sectional detail showing a modification.

In the drawings there appears a pair of glasses 1 including a bridge 2. In carrying out the invention there is provided a nose-engaging prop 3 comprising a foot 4, a head 5 and a shank 6 connecting the head and the foot. The foot 4 is so shaped as to fit without discomfort on the nose of the wearer, the shank of the nose-engaging prop slanting forwardly and downwardly, as shown in Figure 3, and the head 5 of the nose-engaging prop being curved from end to end to conform to the curvature of the rear surface of the bridge 2.

At its ends, the head 5 of the nose-engaging prop 3 is equipped with transverse fingers 7, adapted to be bent around the bridge 2 to hold the nose-engaging prop in place.

The device forming the subject matter of this application will be found entirely effective for the ends in view, and since the fingers 7 are provided, the device may be mounted on the bridge of a pair of glasses without drilling, filing or otherwise altering the glasses in any way.

In Figure 5, parts hereinbefore described have been designated by numerals previously used, with the suffix "a". The modification in Figure 5, consists in forming the shank $6^a$ of the prop $3^a$ integrally with the bridge $2^a$. The numeral $4^a$ marks the foot.

Figure 2 will show that the prop 3, considered as a whole, is of H-shape.

Having thus described the invention, what I claim is:—

1. The combination with a pair of glasses including a bridge of a nose-engaging prop including a shank carried by the bridge, and a transverse foot on the lower end of the shank and extended in opposite directions on both sides of the shank, the nose-engaging prop slanting downwardly and outwardly with respect to the lens-plane of the glasses, and the foot being curved to fit upon the nose of the wearer of the glasses.

2. In a device of the class described, a nose-engaging prop of approximately H-shape, the prop comprising a head, a foot, a reduced shaft connecting the head and the foot, and means carried by the head for assembling the head with the bridge of a pair of glasses.

In testimony that I claim the foregoing as my own, I have hereto affixed my signature.

HOUSTON MONROE CARROLL, Sr.